3,035,057
DICHLOROISOCYANURATE PROCESS
AND PRODUCTS
William F. Symes, Webster Groves, and Nicholas S.
Hadzekyriakides, Clayton, Mo., assignors to Monsanto
Chemical Company, St. Louis, Mo., a corporation of
Delaware
No Drawing. Filed Sept. 26, 1961, Ser. No. 140,657
12 Claims. (Cl. 260—248)

This invention relates to a novel process of making sodium dichloroisocyanurate, potassium dichlorocyanurate or hydrates of these compounds or mixtures of these compounds. This invention more particularly relates to a method of making sodium dichloroisocyanurate and hydrates thereof, and to a method of making potassium dichloroisocyanurate from trichloroisocyanuric acid and tripotassium isocyanurate in an aqueous medium. The invention also relates to a novel compound, namely potassium dichloroisocyanurate monohydrate.

Anhydrous sodium dichloroisocyanurate or anhydrous potassium dichloroisocyanurate or hydrates thereof or mixtures of these compounds are highly useful sources of available chlorine in solid bleach and/or detergent compositions. Potassium dichloroisocyanurate monohydrate is a novel compound from which a surprisingly stable form of anhydrous potassium dichloroisocyanurate can be prepared.

Sodium dichloroisocyanurate (sometimes called sodium dichlorocyanurate) and hydrates thereof which structurally can be represented as follows:

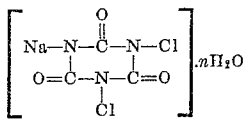

wherein $n$ is an integer from 0 to 2, inclusive, have recently been found to be useful sources of available chlorine in solid bleach and detergent compositions. The dihydrate of sodium dichloroisocyanurate which contains 14.1% water of hydration and the monohydrate of sodium dichloroisocyanurate which contains 7.6% water of hydration and anhydrous sodium dichloroisocyanurate are all white crystalline solids having distinct X-ray diffraction patterns.

Anhydrous potassium dichloroisocyanurate, sometimes termed potassium dichlorocyanurate, which can be represented structurally as:

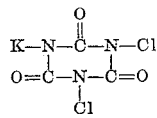

and the monohydrates thereof, also is a highly useful source of available chlorine in solid bleach and detergent compositions.

The novel methods of making sodium dichloroisocyanurate and hydrates thereof, and the novel methods of making potassium dichloroisocyanurate from trichloroisocyanuric acid and tripotassium isocyanurate in an aqueous medium and the novel compound potassium dichloroisocyanurate monohydrate were disclosed, respectively, in applications for Letters Patent, Serial No. 760,853, filed September 15, 1958, and Serial No. 807,285, filed April 20, 1959, both of which applications are assigned to the same assignee as the present application. The disclosure contained in the present application should be taken in conjunction with said applications Serial Nos. 760,853 and 807,285, now abandoned, and considered as a continuation-in-part of said application.

It is an object of the present invention to provide a novel compound, namely potassium dichloroisocyanurate monohydrate, which is particularly useful in preparing an unexpectedly stable form of anhydrous potassium dichloroisocyanurate.

It is another object of the invention to provide a method of making potassium dichloroisocyanurate monohydrate.

It is a further object of the invention to provide a commercially safe, economical and practical method of making sodium dichloroisocyanurate or potassium dichloroisocyanurate or mixtures thereof in good yields and without the formation of dangerous by-products or other reaction products which would require a purification process step to separate such by-products from the sodium and/or potassium dichloroisocyanurate.

It is still further an object of the present invention to provide a safe and economical method for preparing sodium dichloroisocyanurate, potassium dichloroisocyanurate or mixtures thereof without the formation of dangerous and harmful reaction or decomposition products such as nitrogen trichloride.

It has been found possible, in accordance with this invention to prepare sodium dichloroisocyanurate, potassium dichloroisocyanurate and mixtures thereof by a process which comprises bringing together and reacting two molecular proportions of trichloroisocyanurate and one molecular proportion of trisodium isocyanurate or tripotassium isocyanurate or mixtures of these isocyanurates in an aqueous medium at a temperature in the range of from about 0° C. to about 60° C., the rate of addition and of mixing the trichloroisocyanuric acid and the isocyanurate or isocyanurates being such as to maintain a pH in the range of from about 5.0 to about 8.5, thereby forming an aqueous reaction slurry comprising sodium dichloroisocyanurate, potassium dichloroisocyanurate or mixtures thereof, respectively, in suspension and separating the resulting dichloroisocyanurate solids from the bulk of the aqueous phase associated therewith. When trisodium isocyanurate is used sodium dichloroisocyanurate can be formed and when tripotassium cyanurate is used, potassium dichloroisocyanurate can be produced. Mixtures of sodium and potassium dichloroisocyanurate can be produced from mixtures of these tri-metal isocyanurates.

In accordance with this invention there is provided a convenient, efficient and economical method of making sodium dichloroisocyanurate and hydrates thereof, which method comprises bringing together and reacting substantially two molecular proportions of trichloroisocyanurate (sometimes called trichlorocyanuric acid) and one molecular proportion of trisodium isocyanurate (sometimes called sodium or trisodium cyanurate) in an aqueous medium maintained at a pH of about 5.0 to 7.5 at a temperature in the range of 0° C. to 50° C., preferably in the range of about 10° C. to 50° C., but more preferably in the range of from about 20° C. to about 40° C., thereby forming an aqueous reaction mixture comprising an aqueous slurry of sodium dichloroisocyanurate dihydrate, separating the said dihydrate from the bulk of the aqueous phase associated therewith, and drying same to provide the dihydrate or the monohydrate or the anhydrous salt or any mixture thereof.

In general, the amount of water present in the reaction system at any one time should be in the range of about 50% to about 90% of the total contents thereof and it is particularly preferred that sufficient water be present to maintain the trisodium isocyanurate reactant in solution.

The trisodium isocyanurate reactant can be added to the reaction zone in any manner, that is, it can added as a dry solid, or as water-wet solid, or as aqueous slurry, or, and preferably, as an aqueous solution thereof, e.g., one containing 3 to 14 parts by weight of trisodium isocyanurate per 100 parts by weight of water. When added as a dry solid or water-wet solid or aqueous slurry, it is preferred that it be added to an aqueous heel containing sufficient water to dissolve the trisodium isocyanurate solids. When added in the form of an aqueous solution it is preferred that the solution be as concentrated as possible.

The trichloroisocyanurate reactant can be added to the reaction zone as a dry solid but preferably as a water-wet solid such as a mixture of 5 to 25 parts by weight of water and 100 parts by weight of trichloroisocyanurate.

The respective reactants can be added to the reaction zone in any manner, as for example, one to the other, or simultaneously, or any combination thereof provided of course the agitation is sufficient to permit intimate and uniform contact between the said reactants. It is preferred that the respective reactants be added to the reaction zone simultaneously or in a substantially simultaneous manner in that higher yields are obtained. Under such preferred operating conditions the respective amounts of the added reactants can be controlled by maintaining the pH in the reaction zone in the range of 5.0 to 7.0 and particularly in the range of from about 5.4 to about 5.8, that is to say, the maintenance of such pH conditions defines substantially stoichiometric conditions, that is, substantially two molecular proportions of trichloroisocyanurate per molecular proportion of trisodium isocyanurate. Although it is preferred to carry out the reaction within the aforementioned pH range it is also possible to effect the reaction at a pH of 5.0 to 7.5.

It has been found that a portion of the triazine ring of trisodium isocyanurate, when reacted with trichlorocyanuric acid at a pH above about 7.5, will decompose in significant amounts, resulting in the formation of dangerous degradation products such as $NCl_3$ which is a hazardous material in that it is both a poison and a dangerous explosive. As a consequence of such decomposition, the reaction of trisodium isocyanurate and trichloroisocyanuric acid under such conditions in large scale production operations may be hazardous (because of toxicity and explosion dangers) to personnel and may further result in loss of valuable plant equipment. Also, due to such decomposition, lower yields of sodium dichloroisocyanurate are otbained. When trisodium isocyanurate is reacted with trichloroisocyanuric acid of a pH slightly below 5.0 the reaction product formed is a mixture of sodium dichloroisocyanurate and trichloroisocyanuric acid or trichloroisocyanuric acid per se.

The simultaneous or substantially simultaneous addition of the respective reagents to the reaction zone is the preferred manner of carrying out the process of this invention. The preferred procedure comprises simultaneously bringing together and reacting the respective reactants in the aqueous medium, thereby forming an aqueous reaction mixture comprising an aqueous slurry of sodium dichloroisocyanurate dihydrate, a portion of the aqueous reaction mixture so produced is continuously removed, preferably at a rate sufficient to maintain the volume of the reaction mixture in the reaction zone substantially constant. The solids are then separated from the bulk of the aqueous phase with which they are associated in the removed portion of the aqueous reaction mixture by any of the well known methods for separating solids from liquids such as filtration, centrifugation, decantation, or the like. The water-wet solid product is then dried or dehydrated to provide the dihydrate or the monohydrate or the anhydrous salt or any combination thereof.

Since the solid reaction product (i.e., sodium dichloroisocyanurate dihydrate) is moderately soluble in water, in order to obtain increased yields and improve the efficiency of the process, it is preferred that the aqueous reaction mixture obtained upon bringing together and reacting substantially two molecular proportions of trichloroisocyanurate and one molecular proportion of trisodium isocyanurate, be either cooled to say 0° to 5° C. and then separate the solids from the aqueous phase or, and preferably, vacuum concentrated at 25° C. to 50° C. to remove a substantial amount of the water (e.g., 25 to 75% thereof) and the residue cooled to say 0° C. to 5° C. and then separate the solids from the aqueous phase. In either instance the recovered aqueous phase can be recycled to the reaction zone or employed as the aqueous heel in a subsequent run, or if it contains a sizable amount of the reaction product it can be vacuum concentrated to remove a substantial amount of the water and precipitated solids recovered.

The sojourn time of an increment of trisodium isocyanurate and an increment of trichloroisocyanuric acid to produce an increment of sodium dichloroisocyanurate dihydrate in the aqueous medium in the reaction zone is usually less than 5 minutes and in most instances is substantially instantaneous.

As illustrative of the process of this invention but not limitative thereof is the following:

*Example I*

To a suitable reaction vessel equipped with a thermometer, agitator and an ice-bath for controlling the reaction tempertaure is added 195 parts by weight of trisodium isocyanurate in the form of a 10% by weight aqueous solution thereof. Simultaneous with said addition there is added 465 parts by weight of dry trichloroisocyanurate at such a rate and with sufficient agitation to maintain a pH of 5.8 to 6.0. Throughout the addition of the respective reagents the temperature in the reaction zone is maintained at about 25° C. Upon completion of the addition of the reagents the reaction mass is agitated for about 30 minutes at about 25° C. and ten cooled to about 5° C. and filtered. The wet filter cake which contains about 20% by weight of moisture is then dried under vacuum at 30° C. yielding approximately 460 parts by weight of white crystalline sodium dichloroisocyanurate dihydrate. The filtrate is then vacuum concenttrated at 45° C. to remove substantially 50% of the water and the residue cooled to about 5° C. and filtered. The wet filter cake which contains about 15% by weight of moisture is then dried under vacuum at 30° C. yielding approximately 120 parts by weight crystalline sodium dichloroisocyanurate dihydrate. The removed filtrate is vacuum concentrated at 45° C. to remove substantially 75% of the water. The residue is cooled to about 5° C. and filtered. The wet filter cake on drying at 26° C. under vacuum, yielded approximately 85 parts by weight of sodium dichloroisocyanurate dihydrate. The total yield of sodium dichloroisocyanurate is approximately 88% by weight based on the trisodium isocyanurate charged. During the course of the reaction no detectable amounts of $NCl_3$ were formed.

Approximately 100 parts by weight of sodium dichloroisocyanurate dihydrate so obtained upon drying in an air circulating oven at 110° C. for about 3 hours yielded approximately 95 parts by weight of anhydrous white crystalline sodium dichloroisocyanurate.

*Example II*

To a one liter reaction vessel equipped with a thermometer, agitator and ice-bath for controlling the reaction temperature is added approximately 50 cc. of water. Thereto is added 195 grams of trisodium isocyanurate in the form of a 12% by weight aqueous solution thereof. Simultaneously with the addition of said aqueous solution of trisodium isocyanurate there is added 465 grams of trichloroisocyanurate as a water-wet solid containing 15% by weight of water at such a rate and with sufficient agitation to disperse said water-wet solid in said aqueous solution to maintain a pH in the range of 5.5 to 5.6. Throughout the addition of said aqueous solution and said water-wet solid the reaction zone is maintained at 30±2° C. A substantially constant volume of about 500 cc. is maintained in the reaction zone by removing periodically from the reaction zone a portion of the solid reaction product i.e., sodium dichloroisocyanurate dihydrate) together with the aqueous phase associated therewith by means of a suction pump into a vacuum concentrator. The sojourn time of the reaction product in the reaction is about 10 minutes. The slurry so removed is then concentrated at 25° C. and 20 mm. of mercury pressure to provide an aqueous slurry having 30% total solids. The volume in the vacuum concentrator is maintained at about 500 cc. by periodically discharging the concentrated aqueous slurry to a cooling receptacle wherein the so removed slurry is cooled to about 5° C. The so cooled slurry is then passed to a batch centrifuge and dewatered to an uncombined water content of about 20% by weight. When the centrifuge cake builds up to the capacity of the centrifuge, the slurry is removed from the vacuum concentrator and cooling receptacle is diverted to another batch centrifuge and dewatered to an uncombined water content of about 20% by weight. The centrifuge effluents which contain approximately 12% total solids are collected and returned to the vacuum concentrator where at 25° C. and 20 mm. of mercury pressure water is removed to provide an aqueous slurry containing 30% total solids, cooled to about 5° C. and then discharged to a batch centrifuge and dewatered to an uncombined water content of about 20% by weight. The centrifuge effluent is then vacuum concentrated at about 45° C. so as to remove substantially all of the uncombined water and the residue combined with the aforesaid centrifuge cakes and dried at 110° C. for about 8 hours. The total yield of anhydrous white crystalline sodium dichloroisocyanurate is approximately 98.5% by weight based on the trichloroisocyanurate charged. During the entire course of the process no detectable amount of $NCl_3$ was formed.

Repeating Example II but drying the combined centrifuge cakes at 70° C. in vacuo for about 3 hours yields white crystalline sodium dichloroisocyanurate monohydrate (approximately 98% by weight yield based on the trichloroisocyanurate charged).

Repeating Example II but drying the combined centrifuge cakes at 30° C. in vacuo for about 2.5 hours yields white crystalline sodium dichloroisocyanurate dihydrate (approximately 98% yield by weight based on the trichloroisocyanurate charged).

The products of the process of this embodiment of the present invention, that is, sodium dichloroisocyanurate and the hydrates thereof, are free flowing materials and are useful as the active constituents of compositions having oxidizing, bleaching and disinfecting properties and can be compounded with various surfactants to provide detergent compositions further characterized by oxidizing, bleaching and disinfecting properties. The anhydrous salt is also useful as a lachrymator and as a halogenating agent. For most purposes sodium dichloroisocyanurate will be used in the anhydrous or substantially anhydrous form, that is, having a water content whether combined or uncombined of less than about 2% by weight.

In accordance with another aspect of this invention, it has been found that anhydrous or substantially anhydrous potassium dichloroisocyanurate can be prepared in a convenient, efficient and economical maner, the process essentially comprising reacting substantially one molecular proportion of tripotassium isocyanurate (often termed tripotassium cyanurate) with substantially two molecular proportions of trichloroisocyanuric acid (often termed trichlorocyanuric acid) in an aqueous medium while maintaining the pH in the range of 6.5 to 8.5 and the reaction temperature in the range of from about 0° to about 60° C., separating the solid reaction product and drying or dewatering same to provide an anhydrous or substantially anhydrous (i.e., not more than about 2% by weight of water) product. Although it is preferred to employ a reaction pH within the aforementioned range it is also possible to carry out the reaction at a pH within the range of from 6.0 to 8.5.

In general, a flowable mixture of water and tripotassium isocyanurate, for example, one containing from 3 to 50 parts by weight of the said potassium salt per 100 parts water, will be added to a suitable vessel while simultaneously adding and intimately mixing trichloroisocyanuric acid therewith, said trichloroisocyanuric acid being added as a dry solid or as a water-wet solid but preferably as a water-wet solid, for example, a flowable mixture containing 5 to 25 parts by weight of water per 100 parts by weight of trichloroisocyanuric acid. It is necessary that trichloroisocyanuric acid and tripotassium isocyanurate be added at such a rate and with sufficient agitation to maintain the reaction mass at a pH in the range of 6.5 to 8.5, but preferably in the range of from about 7.0 to about 7.9, otherwise, the yield of the desired potassium dichlorocyanurate reaction product will be substantially decreased. It has been observed that at a pH above 8.5 considerable decomposition of the triazine ring of the isocyanurate takes place evolving nitrogen trichloride and thereby producing highly hazardous conditions. On the other hand, tripotassium isocyanurate may be reacted with trichloroisocyanuric acid at a pH of up to 8.5 without a significant amount of decomposition and the accompanying formation of degradation products and loss of yield of potassium dichloroisocyanurate.

When tripotassium isocyanurate is reacted with trichloroisocyanuric acid at a pH below about 6.0 but above 5.0 the reaction product formed is either a mixture of potassium dichloroisocyanurate and a material which is one or more distinctly different complex potassium-containing chlorocyanurate compounds (which is not trichloroisocyanuric acid) or a such potassium-containing complex compound per se. Employment of a pH in the range of 6.5 to 8.5 and particularly a pH in the range of from about 7.0 to about 7.9 defines substantially stoichiometric amounts of the respective reagents, that is, substantially two molecular proportions of trichloroisocyanuric acid and substantially one molecular proportion of tripotassium isocyanurate.

During the addition of trichloroisocyanuric acid to and mixing with flowable mixture of water and tripotassium isocyanurate, the mass is maintained at a temperature in the range of from about 0° C. and to about 60° C., but preferably in the range of about 15° C. to about 50° C. It is particularly preferred that the reaction temperature be in the range of from about 20° C. to about 40° C. Depending upon the reaction temperature employed in the process of this invention, anhydrous potassium dichloroisocyanurate can be ultimately recovered in one of two different physical forms or mixtures thereof. For purposes of this invention, one anhydrous form will be called Form I and the other anhydrous form will be called Form II. Form I potassium dichloroisocyanurate is a white crystalline solid whose internal and external symmetry is monoclinic. Form II potassium dichloroisocyanurate is a white crystalline solid whose internal symmetry is monoclinic but whose external symmetry is triclinic. These anhydrous forms have the same X-ray diffraction pattern and both decompose without melting at above about 230° C. They cannot be transformed into one another by heat treatment or exposure to surface moisture. When tripotassium isocyanurate is reacted with trichloroisocyanuric acid in accordance with the process of this invention at a temperature above about 56° C. anhydrous Form I separates from the reaction mass. However, when tripotassium isocyanurate is reacted with trichloroisocyanuric acid according to the process of this invention at a reaction temperature below about 52° C. the solid which precipitates is potassium dichloroisocyanurate monohydrate, which monohydrate on losing its water of hydration gives Form II potassium dichloroisocyanurate. When reaction temperatures in the range of about 52° C. to 56° C. are employed, the separated solids are a mixture of Form I potassium dichloroisocyanurate and potassium dichloroisocyanurate monohydrate, which mass on drying to remove the water provides a mixture of the respective anhydrous forms, that is, a mixture of Form I and Form II. With respect to the monohydrate of potassium dichloroisocyanurate which separates from a reaction mass obtained upon chlorinating tripotassium isocyanurate at temperatures below about 52° C., this product is a white crystalline solid whose internal and external symmetry is triclinic and whose X-ray diffraction pattern is distinct from either that of Form I or Form II potassium dichloroisocyanurate which patterns, as aforenoted, are the same. This monohydrate of potassium dichloroisocyanurate upon losing its water of hydration yields Form II potassium dichloroisocyanurate. However, the dehydrated crystal maintains the same size and shape of the parent monohydrate. In other words, Form II potassium dichloroisocyanurate is the pseudomorph of the monohydrate of potassium dichloroisocyanurate.

It was surprising to discover that whereas potassium dichloroisocyanurate has, or exists in, two distinct crystalline anhydrous forms, sodium dichloroisocyanurate occurs in but one anhydrous form. It was also unexpected to find that although potassium dichloroisocyanurate exists in but one hydrate form (e.g. the monohydrate), sodium dichloroisocyanurate exists in two hydrate forms, namely as the monohydrate or dihydrate.

Upon adding trichloroisocynanuric acid as a dry or water-wet solid to and intimately mixing with the flowable mixture of water and tripotassium isocyanurate in the reaction zone in accordance with the process of this invention, there is obtained an aqueous reaction mixture having a pH in the range of 6.5 to 8.5, but preferably one having a pH in the range of from about 7.0 to about 7.9 which comprises a slurry of the dichloroisocyanurate reaction product of said reactants (i.e., Form I potassium dichloroisocyanurate or the monohydrate potassium dichloroisocyanurate or mixture thereof depending upon the reaction temperature as aforementioned). Some of the dichloroisocyanurate reaction product is soluble in the aqueous reaction medium (approximately 10 parts by weight per 100 parts by weight of water at 25° C.). It is particularly preferred that the reaction zone to which the respective reagents are aded be initially charged with an aqueous heel, which may be water per se or an aqueous solution of potassium dichloroisocyanurate.

A particularly useful aqueous heel is the mother liquor (e.g. the centrifuge effluent) of a previously conducted reaction wherein tripotassium isocyanurate is reacted with trichloroisocyanuric acid in accordance with the process of this invention.

The instant process is preferably conducted in a continuous manner. That is, trichloroisocyanuric acid as a dry or water-wet solid and a flowable mixture of water and tripotassium isocyanurate respectively are continuously and simultaneously brought together in an aqueous medium in a reaction zone, the respective reagents being added at such a rate and under such agitating conditions that the resulting reaction mass maintains a pH in the range of 6.5 to 8.5, but preferably in the range of from about 7.0 to about 7.9 and is (i.e. the reaction mass) maintained at a temperature in the range of from about 0° C. to about 60° C., preferably in the range of from 15° C. to 50° C. It is particularly preferred that the range employed be from about 20° C. to about 40° C. There is thus formed an aqueous reaction mixture having a pH in the range of 6.5 to 8.5 but preferably from 7.0 to about 7.9 which comprises an aqueous slurry of the reaction product of said reactants (i.e. Form I potassium dichloroisocyanurate or the monohydrate of potassium dichloroisocyanurate or mixture thereof depending upon the reaction temperatures as hereinbefore discussed). The reaction product so formed in the aqueous reaction mixture in the reaction zone is preferably continuously removed from the reaction zone together with a portion of the aqueous medium, preferably so as to maintain the volume of the aqueous reaction mixture in the reaction zone substantially constant. The sojourn time of an increment of tripotassium isocyanurate and an increment of trichloroisocyanuric acid in the reaction zone required to produce an increment of the reaction product of said reactants is usually less than 5 minutes. The solid reaction product of said reactants is then separated from the bulk of the aqueous phase with which it is associated in the aqueous reaction mixture by any of the well-known methods of separating solids from liquids such as filtration, decantation, centrifugation and the like. It is preferred in the manufacture of Form II potassium dichloroisocyanurate that the removed aqueous reaction mixture be cooled, for example to a temperature in the range of about 10° C. to about 20° C., before separating the solids from the bulk of the aqueous phase with which they are associated. The separated solids are then dried so as to remove water, both combined and uncombined, to provide a product having less than 2% by weight of water. When such a cooling operation is employed prior to the solids separation step, the mother liquor or supernatant which contains but a small amount of the desired reaction product (solubility of $KCl_2N_3C_3O_3$ in water at 10° C. is about 5.7 grams per 100 grams of water) can be discarded or can be vacuum concentrated, as for example, at a temperature of about 25° C. to about 50° C. to remove a substantial proportion of the water, as for example up to about 50% thereof. By so doing additional amounts of the desired reaction product precipitate and are readily removed as for example, by filtration or centrifugation and thereafter dried.

As illustrative of the process of this invention but not limitative thereof is the following:

*Example III*

Approximately 100 grams of an 8% by weight aqueous solution of potassium dichloroisocyanurate is charged into a cylindrical reaction vessel equipped with a thermometer, a 6-bladed turbine propeller agitator, pH electrodes and tubes for introducing the reagents into the bottom of the reaction vessel. The reaction vessel is also provided with a tube extending vertically downward for removal of the reaction product. To the reaction vessel is added continuously 1,080 grams of wet trichloroisocyanuric acid (12% moisture) and simultaneously with said addition is continuously added 3,344 grams of a 14.2% aqueous solution of tripotassium isocyanurate. The addition of the respective reagents is so regulated that a pH in the range of 7.0 to 7.5 is maintained. The average rate of feed of the wet trichloroisocyanuric acid is approximately 107.5 grams per hour and the average rate of feed of the aqueous tripotassium isocyanurate solution is approximately 333 grams per hour. As the reagents are added the reaction mass is constantly agitated and the reaction mass is maintained at 30±2° C. by employment of an ice-bath. The reaction product removal tube is positioned in the reaction vessel so as to maintain the contents therein at 900 grams, the level of the reaction vessel being maintained constant by continuously pumping a portion of the reaction slurry through the removal tube to a concentrator. This portion which is pumped to the concentrator at an average rate of 450 grams per hour contains approximately 31.5% by weight potassium dichloroisocyanurate, the undissolved solids being the monohydrate of potassium dichloroisocyanurate. In the concentrator the reaction slurry is subjected to vacuum concentration at 25° C. and 20 mm. of mercury and the water evaporated until a 45% slurry is obtained. This 45% slurry is then filtered so as to separate the solids (actually the monohydrate of potassium dichloro isocyanurate) and the filtrate which contains 9% by weight potassium dichloroisocyanurate is pumped to a second concentrator wherein at 20° C. and under a vacuum of 20 mm. of mercury it is concentrated so as to provide a slurry containing 35% by weight potassium dichloroisocyanurate, which slurry is then filtered to separate the solid monohydrate of potassium dichloroisocyanurate. During the entire course of the reaction, substantially no decomposition occurred and no detectable amounts of $NCl_3$ were evolved.

The filter cakes are dried in an air circulating oven at 105° C. and the dried products combined. The yield of potassium dichloroisocyanurate is 1,519 grams and based on the tripotassium isocyanurate charged is 89.5% by weight. This anhydrous product is Form II potassium dichloroisocyanurate, a white crystalline solid having a monoclinic internal symmetry and a triclinic external symmetry and is characterized by the same size and shape as its precursor, i.e., the monohydrate of potassium dichloroisocyanurate. This monohydrate precursor contains about 7% of water of hydration and has a triclinic internal symmetry and a triclinic external symmetry.

The X-ray diffraction pattern of the monohydrate of potassium dichloroisocyanurate is as follows ($d$ in order of decreasing intensity):

$d$ (INTERPLANAR SPACINGS)

(1) 3.35
(2) 6.44
(3) 3.22
(4) 2.97
(5) 7.61
(6) 3.20
(7) 3.09
(8) 2.61
(9) 4.15
(10) 3.34
(11) 3.42
(12) 2.35
(13) 2.58
(14) 2.81
(15) 1.82

*Example IV*

Approximately 100 grams of 20% by weight aqueous solution of potassium dichloroisocyanurate at about a temperature of 56° C. is charged into a cylindrical reaction vessel equipped with a thermometer, a 6-bladed turbine propeller agitator, pH electrodes and tubes for introducing the reagent into the bottom of the reaction vessel. To the reaction vessel is added continuously 1,945 grams of an aqueous solution of tripotassium isocyanurate containing 25 grams of tripotassium isocyanurate per 100 grams of the solution. Simultaneously with said addition is continuously added 929 grams of dry trichloroisocyanuric acid. The addition of the respective reagents is so regulated that a pH in the range of 7.2 to 7.6 is maintained. The time consumed in adding the reagents is two hours. The temperature in the reaction system is maintained at 58±2° C. throughout the addition of the respective reagents. The mass is continually agitated for about 30 minutes after completion of the addition of said reagents at 58±2° C. Thereupon agitation is stopped and while maintaining the said temperature vacuum is applied to remove 600 grams of water over a one hour period. The vacuum is released and the mass is filtered at 58° C. The wet cake which contains approximately 10% moisture is then dried in an air circulating oven at 105° C. yielding 1,207 grams of Form I potassium dichloroisocyanurate, a white crystalline compound whose internal and external symmetry is monoclinic. The filtrate (approximately 1,035 grams) which contains 239 grams of dissolved potassium dichloroisocyanurate upon vacuum concentrating at about 58° C. to reduce the volume by 50% yield an additional 120 grams of Form I potassium dichloroisocyanurate after filtering off and drying the precipitate. The filtrate can be discarded or used in subsequent operations as a heel.

The filtrates from Example IV on cooling below about 52° C. give up potassium dichloroisocyanurate monohydrate which monohydrate on losing its water of hydration yields white crystalline Form II potassium dichloroisocyanurate. Thus, there is provided a means of converting Form I potassium dichloroisocyanurate to Form II potassium dichloroisocyanurate. The process essentially comprising dissolving Form I potassium dichloroisocyanurate in water and thereafter at a temperature below about 52° C. subjecting said solution to a crystallization operation, e.g. by cooling or evaporation of said solution or by other means for crystallizing a solute from a solution well-known to those skilled in the art. The precipitate obtained is potassium dichloroisocyanurate monohydrate, which monohydrate upon being removed from the aqueous phase in admixture therewith and drying provides Form II potassium dichloroisocyanurate. The monohydrate per se can be employed as a source of available chlorine.

In the process of this invention tripotassium isocyanurate is added in the form of an aqueous solution or aqueous slurry thereof, which flowable mixture preferably contains from about 3 to about 50 parts of tripotassium isocyanurate per 100 parts of water. It is particularly preferred however that the flowable mixture contain from about 10 to about 25 parts of tripotassium isocyanurate per 100 parts of water.

In general it is preferred that the amount of water in the reaction zone be in excess of about 30% by weight of the total contents thereof and preferably in excess of about 50% of the total contents thereof.

As illustrative of the stability of potassium dichloroisocyanurate as compared to sodium dichloroisocyanurate 3.3 parts by weight of each in anhydrous powdered (−140 +200 mesh) crystalline form were mechanically mixed with 96.7 parts by weight of anhydrous sodium metasilicate and then placed in sealed jars and held in an oven at 136° F. for 311 hours. The respective mixtures were removed to determine the amount of available chlorine of the respective chlorine compounds that had been lost. The results are set forth below.

| Compound: | Percent loss of available chlorine after 311 hours |
|---|---|
| Sodium dichloroisocyanurate | 26.5 |
| Potassium dichloroisocyanurate, Form II | 1.0 |

The tripotassium isocyanurate reactant employed in Examples I and II was prepared by mixing three molecular proportions of potassium hydroxide in the form of a 40 to 50% aqueous solution thereof with one molecular proportion of isocyanuric acid ($H_3C_3O_3N_3$) in admixture with water, e.g., a water-wet solid containing from 35 to 50% by weight moisture, to form a slurry, which slurry was then diluted with water to provide solutions of the stated concentrations of tripotassium isocyanurate in the said examples. According to the literature tripotassium isocyanurate hydrolyzes readily upon exposure to moisture and particularly in aqueous solutions thereof to provide potassium hydroxide and dipotassium hydrogen isocyanurate ($K_2HC_3O_3N_3$) in equimolecular amounts, which mixture however functions in chemical reactions as if it was in fact tripotassium isocyanurate. Thus it is to be understood by the term "tripotassium isocyanurate" as employed herein and in the appended claims is meant to include tripotassium isocyanurate per se, equimolecular weight proportions of potassium hydroxide and dipotassium hydrogen isocyanurate obtained upon hydrolysis of said tripotassium isocyanurate or synthetic mixtures thereof obtained upon mixing equimolecular amounts of potassium hydroxide and dipotassium hydrogen isocyanurate in a dry or aqueous medium. As aforementioned tripotassium isocyanurate can be added to the reaction zone in the form of an aqueous slurry thereof and it is to be understood that such slurries include a mixture of water and equimolecular amounts of potassium hydroxide and dipotassium hydrogen isocyanurate wherein a portion of the latter is undissolved.

Potassium dichloroisocyanurate monohydrate is useful as noted hereinbefore for the preparation of Form II potassium dichloroisocyanurate by dehydrating the monohydrate at say about 60° C. This monohydrate or Form I or Form II potassium dichloroisocyanurate can be added to water or to aqueous solutions of alkaline alkali metal salts, such as sodium tripolyphosphate and/or wetting agents such as sodium dodecylbenzene sulfonate, to provide aqueous solutions containing available chlorine for bleaching, disinfecting or sterilizing purposes.

*Example V*

The procedure of Example III was repeated except that an aqueous solution containing 7.0% by weight of tripotassium isocyanurate and 7.2% by weight of trisodium isocyanurate was employed instead of the aqueous solution of tripotassium isocyanurate. The product obtained was a wet cake containing 10% by weight of moisture and a mixture of sodium dichloroisocyanurate dihydrate and potassium dichloroisocyanurate monohydrate. This product was vacuum dried at 20° C. at a pressure of 20 mm. of mercury to produce dry crystals consisting of a mixture of sodium dichloroisocyanurate dihydrate and potassium dichloroisocyanurate monohydrate. Upon further drying in an air circulating oven at a temperature of 105° C. for several hours, a crystalline mixture containing sodium dichloroisocyanurate monohydrate, anhydrous sodium dichloroisocyanurate and anhydrous (Form II) potassium dichloroisocyanurate was formed. Upon continued heating at 105° C. a crystalline mixture consisting of anhydrous sodium dichloroisocyanurate and anhydrous (Form II) potassium dichloroisocyanurate was obtained. The yield of mixture was 90.5% based on the trichloroisocyanuric acid and the metal isocyanurate mixture charged.

In the processes described in Examples I through V substantially no decomposition of the triazine ring of the cyanurates occurred as is evident from the yields obtained. Also, no detectable amounts of $NCl_3$ were evolved.

Since trisodium and tripotassium isocyanurate are alkali metal isocyanurates it would be expected that the reactions of these compounds, with trichloroisocyanuric acid would be similar or identical and it was, therefore, unexpected that somewhat different processes were required in order to safely react these materials under conditions suitable for commercially practical operations. It was also unexpected as noted above to find that sodium dichloroisocyanurate could be prepared in two different hydrate forms and one anhydrous form, whereas potassium dichloroisocyanurate could be prepared in but one hydrate form but could be obtained in two different anhydrous forms.

From the description contained herein and as noted above it is seen that trisodium isocyanurate and tripotassium isocyanurate are unexpectedly different with respect to their reactions with trichloroisocyanuric acid. Surprisingly, however, when mixtures of trisodium and tripotassium isocyanurate are reacted with trichloroisocyanuric acid within the herein-described broad temperature and pH ranges, little or no $NCl_3$ is formed and a mixture of sodium dichloroisocyanurate, potassium dichloroisocyanurate or hydrates thereof is obtained.

What is claimed is:

1. The process which comprises bringing together and reacting substantially two molecular proportions of trichloroisocyanuric acid and one molecular proportion of an isocyanurate selected from the group consisting of trisodium isocyanurate, tripotassium isocyanurate and mixtures thereof in an aqueous medium at a temperature in the range of from 0° C. to 60° C., the rate of addition and of mixing said trichloroisocyanuric acid and said isocyanurate being such as to maintain a pH in the range of from about 5.0 to about 8.5, thereby forming an aqueous reaction slurry comprising a substance selected from the group consisting of sodium dichloroisocyanurate, potassium dichloroisocyanurate and mixtures thereof, respectively, in suspension and separating said substance from the bulk of the aqueous phase associated therewith.

2. The process which comprises bringing together and reacting substantially two molecular proportions of trichloroisocyanuric acid and one molecular proportion of trisodium isocyanurate in an aqueous medium at a temperature in the range of from 0° C. to 50° C. the rate of addition and of mixing said trichloroisocyanuric acid and said trisodium isocyanurate being such as to maintain a pH in the range of 5.0 to 7.5 in said aqueous slurry comprising sodium dichloroisocyanurate dihydrate solids in suspension, and separating the sodium dichloroisocyanurate dihydrate solids from the bulk of the aqueous phase associated therewith in said slurry.

3. The process of claim 2 wherein the separated solids are dried to substantially anhydrous sodium dichloroisocyanurate.

4. The method of making sodium dichloroisocyanurate dihydrate which comprises simultaneously bringing together and reacting at a temperature in the range of 10° C. to 50° C. substantially two molecular proportions of trichloroisocyanuric acid and one molecular proportion of trisodium isocyanurate wherein said trisodium isocyanurate is added in the form of an aqueous solution thereof, the rate of addition and of mixing said trichloroisocyanuric acid and said trisodium isocyanurate being such as to maintain a pH in the range of 5.0 to 7.0 in the reaction system, thereby forming an aqueous reaction mixture having a pH in said range comprising an aqueous slurry of sodium dichloroisocyanurate dihydrate, and separating the solids from said aqueous slurry.

5. The method which comprises continuously and simultaneously adding (1) trichloroisocyanuric acid and (2) an aqueous solution of trisodium isocyanurate to a reaction zone maintained at a temperature in the range of from about 20° C. to about 40° C., the rate of addition and of mixing said trichloroisocyanuric acid and said solution of trisodium isocyanurate being such as to maintain a pH of from about 5.4 to about 5.8, thereby forming an aqueous reaction mixture in said reaction zone, having a pH in said range, comprising an aqueous slurry of sodium dichloroisocyanurate dihydrate, continuously removing a portion of said aqueous reaction mixture from said reaction zone, and separating the sodium dichloroisocyanurate dihydrate from the bulk of the aqueous phase of the portion of the reaction mixture thus removed.

6. A method of making potassium dichloroisocyanurate which comprises continuously and simultaneously mixing together trichloroisocyanuric acid and tripotassium isocyanurate in an aqueous medium in a reaction zone at a pH in the range of about 6.0 to about 8.5, which aqueous medium is continuously maintained at a temperature within the range of 0° C. to 60° C. thereby continuously forming an aqueous reaction mixture in said reaction zone having a pH in said range and comprising an aqueous slurry of potassium dichloroisocyanurate and continuously separating at least a portion of said potassium dichloroisocyanurate from said reaction mixture.

7. The method of making potassium dichloroisocyanurate monohydrate which comprises continuously and simultaneously mixing together trichloroisocyanuric acid and tripotassium isocyanurate in an aqueous medium in a reaction zone and at a pH in the range of 7.0 to 7.9 to provide an aqueous medium containing substantially two molecular proportions of said acid for each molecular proportion of said isocyanurate, which aqueous medium is continuously maintained at a temperature within the range of from about 15° C. to about 50° C., thereby continuously forming an aqueous reaction mixture in said reaction zone having a pH in said range and comprising an aqueous slurry of potassium dichloroisocyanurate monohydrate and continuously removing at least a portion of said monohydrate from said reaction mixture.

8. The method of making an anhydrous crystalline potassium dichloroisocyanurate having a monoclinic internal symmetry and a triclinic external symmetry which comprises continuously and simultaneously mixing together solid trichloroisocyanuric acid containing water mixed therewith and a flowable mixture of water and tripotassium isocyanurate in an aqueous medium in a reaction zone and at a pH in the range of 7.0 to 7.9 to provide an aqueous medium containing substantially two molecular proportions of said acid for each molecular proportion of said isocyanurate, which medium is continuously maintained at a temperature within the range of from about 15° C. to about 50° C., thereby continuously forming an aqueous reaction mixture in said reaction zone, having a pH in said range and comprising an aqueous slurry of potassium dichloroisocyanurate monohydrate and continuously removing at least a portion of said monohydrate from the aqueous phase of said reaction mixture and thereafter drying said monohydrate until said first mentioned crystalline potassium dichloroisocyanurate is formed.

9. The process as in claim 8 wherein potassium dichloroisocyanurate and the aqueous phase associated therewith are removed from the reaction zone at a rate sufficient to maintain the volume of the aqueous reaction mixture in the reaction zone substantially constant.

10. The process as in claim 8 wherein the total water in the reaction zone is in excess of about 30% by weight of the total contents thereof.

11. The process as in claim 9 wherein the trichloroisocyanuric acid and tripotassium isocyanurate are added to a reaction zone initially charged with an aqueous solution containing potassium dichloroisocyanurate monohydrate.

12. The method of making an anhydrous crystalline potassium dichloroisocyanurate having a monoclinic internal symmetry and a monoclinic external symmetry which comprises continuously and simultaneously mixing together solid trichloroisocyanuric acid containing water mixed therewith and a flowable mixture of water and tripotassium isocyanurate in an aqueous medium in a reaction zone and at a pH in the range of 6.0 to 8.5 to provide an aqueous medium containing substantially two molecular proportions of said acid for each molecular proportion of said isocyanurate, which medium is continuously maintained at a temperature within the range of from about 56° C. to 60° C. thereby continuously forming an aqueous reaction mixture in said reaction zone having a pH in said range and comprising an aqueous slurry of crystalline anhydrous potassium dichloroisocyanurate having a monoclinic internal and external symmetry and continuously removing at least a portion of said potassium dichloroisocyanurate from the aqueous phase of said reaction mixture and thereafter drying the potassium dichloroisocyanurate so removed.

References Cited in the file of this patent

UNITED STATES PATENTS

| | | |
|---|---|---|
| 2,472,361 | Arsem | June 7, 1949 |
| 2,578,270 | Strain | Dec. 11, 1951 |
| 2,913,460 | Brown et al. | Nov. 17, 1959 |
| 2,964,525 | Robinson | Dec. 13, 1960 |
| 2,969,360 | Westfall | Jan. 24, 1961 |

FOREIGN PATENTS

| | | |
|---|---|---|
| 1,149,758 | France | July 22, 1957 |

OTHER REFERENCES

Hands et al.: Journal of the Society of Chemical Industry, vol. 67, pages 66–69 (1948).